US011722452B2

(12) United States Patent
Voss et al.

(10) Patent No.: US 11,722,452 B2
(45) Date of Patent: *Aug. 8, 2023

(54) RETENTION MODEL MANAGEMENT FOR CHAT CONVERSATIONS

(71) Applicant: Snap Inc., Santa Monica, CA (US)

(72) Inventors: Jeremy Voss, Los Angeles, CA (US); Jonathan Brody, Marina Del Rey, CA (US); Nathan Kenneth Boyd, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,176

(22) Filed: Jun. 9, 2022

(65) Prior Publication Data
US 2022/0303239 A1 Sep. 22, 2022

Related U.S. Application Data

(63) Continuation of application No. 15/965,645, filed on Apr. 27, 2018, now Pat. No. 11,388,128.

(51) Int. Cl.
*G06F 15/16* (2006.01)
*H04L 51/42* (2022.01)
(Continued)

(52) U.S. Cl.
CPC .............. *H04L 51/42* (2022.05); *H04L 51/04* (2013.01); *H04L 51/216* (2022.05); *H04L 51/52* (2022.05)

(58) Field of Classification Search
CPC ......... H04L 51/04; H04L 51/16; H04L 51/32; H04L 51/22
See application file for complete search history.

(56) References Cited

U.S. PATENT DOCUMENTS 9,584,493 B1\* 2/2017 Leavy .................. H04L 63/104
10,764,221 B1\* 9/2020 Dalonzo ................ H04L 51/52
(Continued)

OTHER PUBLICATIONS

"U.S. Appl. No. 15/965,645, Examiner Interview Summary dated Feb. 17, 2021", 2 pgs.
(Continued)

*Primary Examiner* — Dustin Nguyen
*Assistant Examiner* — Hao H Nguyen
(74) *Attorney, Agent, or Firm* — Schwegman Lundberg & Woessner, P.A.

(57) ABSTRACT

Aspects of the present disclosure involve a system comprising a computer-readable storage medium storing at least one program, and a method for managing chat conversation retention models. The method may include causing display of an interface that enables a user to select one of multiple retention models for association with an electronic chat conversation, and receiving, via the selector interface, a selection of a particular retention model. The retention model specifies an amount of time that each individual message in the electronic chat conversation is accessible upon being read by a receiving user. The method further includes storing a newly received message as part of the chat conversation, where the storing includes configuring a retention duration attribute for the message in accordance with the amount of time specified by the retention model. The method further includes erasing the message in accordance with the retention duration attribute.

20 Claims, 13 Drawing Sheets

(51) Int. Cl.
*H04L 51/04* (2022.01)
*H04L 51/216* (2022.01)
*H04L 51/52* (2022.01)

(56) References Cited

U.S. PATENT DOCUMENTS

| | | | |
|---|---|---|---|
| 11,388,128 B1 | 7/2022 | Voss et al. | |
| 2006/0168046 A1* | 7/2006 | Qureshi | H04L 51/212 709/206 |
| 2006/0177010 A1* | 8/2006 | Skakkebaek | H04M 3/5307 379/67.1 |
| 2010/0094809 A1* | 4/2010 | Consul | H04L 51/42 707/662 |
| 2010/0287249 A1* | 11/2010 | Yigang | G06Q 10/107 709/206 |
| 2010/0299763 A1* | 11/2010 | Marcus | G06Q 10/06 726/30 |
| 2013/0144616 A1* | 6/2013 | Bangalore | G10L 15/20 704/226 |
| 2013/0218896 A1* | 8/2013 | Palay | G06F 16/3334 707/E17.014 |
| 2013/0254408 A1* | 9/2013 | Sreenivasan | G06Q 10/10 709/227 |
| 2014/0032682 A1* | 1/2014 | Prado | H04L 51/214 709/213 |
| 2014/0379813 A1* | 12/2014 | Charania | H04L 51/02 709/206 |
| 2015/0264005 A1* | 9/2015 | Brooks | H04L 51/23 715/753 |
| 2015/0288633 A1* | 10/2015 | Ogundokun | H04L 51/42 709/206 |
| 2015/0331881 A1* | 11/2015 | Myles | H04L 51/42 707/689 |
| 2016/0224660 A1* | 8/2016 | Munk | G06F 16/316 |
| 2016/0234151 A1 | 8/2016 | Son | |
| 2016/0301641 A1* | 10/2016 | Belliston | H04M 1/72436 |
| 2016/0336008 A1* | 11/2016 | Menezes | G06F 40/295 |
| 2016/0344720 A1* | 11/2016 | Nayak | H04L 63/083 |
| 2016/0359778 A1* | 12/2016 | Shi | H04L 51/18 |
| 2016/0359779 A1* | 12/2016 | Shi | H04L 12/189 |
| 2017/0060885 A1* | 3/2017 | Gan | G06F 16/125 |
| 2017/0262139 A1* | 9/2017 | Patel | G06F 3/0482 |
| 2018/0048602 A1* | 2/2018 | Kuramochi | H04L 51/18 |
| 2018/0129587 A1* | 5/2018 | Wunderlich | G06F 11/3664 |
| 2020/0112527 A1* | 4/2020 | Shi | H04L 51/10 |

OTHER PUBLICATIONS

"U.S. Appl. No. 15/965,645, Examiner Interview Summary dated Jul. 15, 2021", 2 pgs.

"U.S. Appl. No. 15/965,645, Examiner Interview Summary dated Sep. 16, 2020", 3 pgs.

"U.S. Appl. No. 15/965,645, Final Office Action dated Oct. 5, 2021", 41 pgs.

"U.S. Appl. No. 15/965,645, Final Office Action dated Nov. 16, 2020", 27 pgs.

"U.S. Appl. No. 15/965,645, Non Final Office Action dated Jun. 8, 2021", 38 pgs.

"U.S. Appl. No. 15/965,645, Non Final Office Action dated Jul. 1, 2020", 24 pgs.

"U.S. Appl. No. 15/965,645, Notice of Allowance dated Mar. 10, 2022".

"U.S. Appl. No. 15/965,645, Response filed Jan. 5, 2022 to Final Office Action dated Oct. 5, 2021", 13 pgs.

"U.S. Appl. No. 15/965,645, Response filed Feb. 16, 2021 to Final Office Action dated Nov. 16, 2020", 12 pgs.

"U.S. Appl. No. 15/965,645, Response filed Aug. 23, 2021 to Non Final Office Action dated Jun. 8, 2021", 13 pages.

"U.S. Appl. No. 15/965,645, Response filed Oct. 1, 2020 to Non Final Office Action dated Jul. 1, 2020", 13 pgs.

* cited by examiner

RETENTION MODEL MANAGEMENT FOR CHAT CONVERSATIONS

PRIORITY APPLICATION

This application is a continuation of U.S. patent application Ser. No. 15/965,645, filed Apr. 27, 2018, the disclosure of which is incorporated by reference herein in its entirety.

TECHNICAL FIELD

The present disclosure generally relates to the technical field of special-purpose machines configured to facilitate electronic chat conversations including computerized variants of such special-purpose machines and improvements to such variants, and to the technologies by which such special-purpose machines become improved compared to other special-purpose machines that facilitate electronic chat conversations.

BACKGROUND

Social media applications, such as chat applications and other messaging applications, on mobile electronic devices allow users to exchange messages with one another. In some instances, such conventional social media applications may implement message retention models in which messages become inaccessible or are erased completely after being read by the receiving user. These applications may provide functionality that allows users to save messages after they are read. Typically, this functionality is provided as a feature of the graphical user interface (GUI) in which a view of a chat conversation is presented. This sort of functionality often requires a user to manually select individual messages from the GUI that they want to save and later manually delete each saved message after it is no longer desired to be saved.

Given the typically limited screen size on mobile electronic devices, the elements within the GUI used to present and interact with the messages are often very small, and thus, the process of selecting individual messages to save can be quite onerous and prone to error. If a user forgets to save a message or selects a different message because of the screen size limitations, the message the user wanted to save may be gone forever. Further, if a user does not actively delete saved messages that are no longer needed, a wastefully large amount of memory is needed to save these messages.

In other instances, conventional social media applications may implement message retention models in which every message of a chat conversation is indefinitely saved (e.g., in a chat transcript). This sort of retention model can also lead to needless over-use of computer memory resources because it is often needless to save every message; further, many users may not even want to have a full record of their conversations saved indefinitely for privacy concerns.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Description

Figure 1:
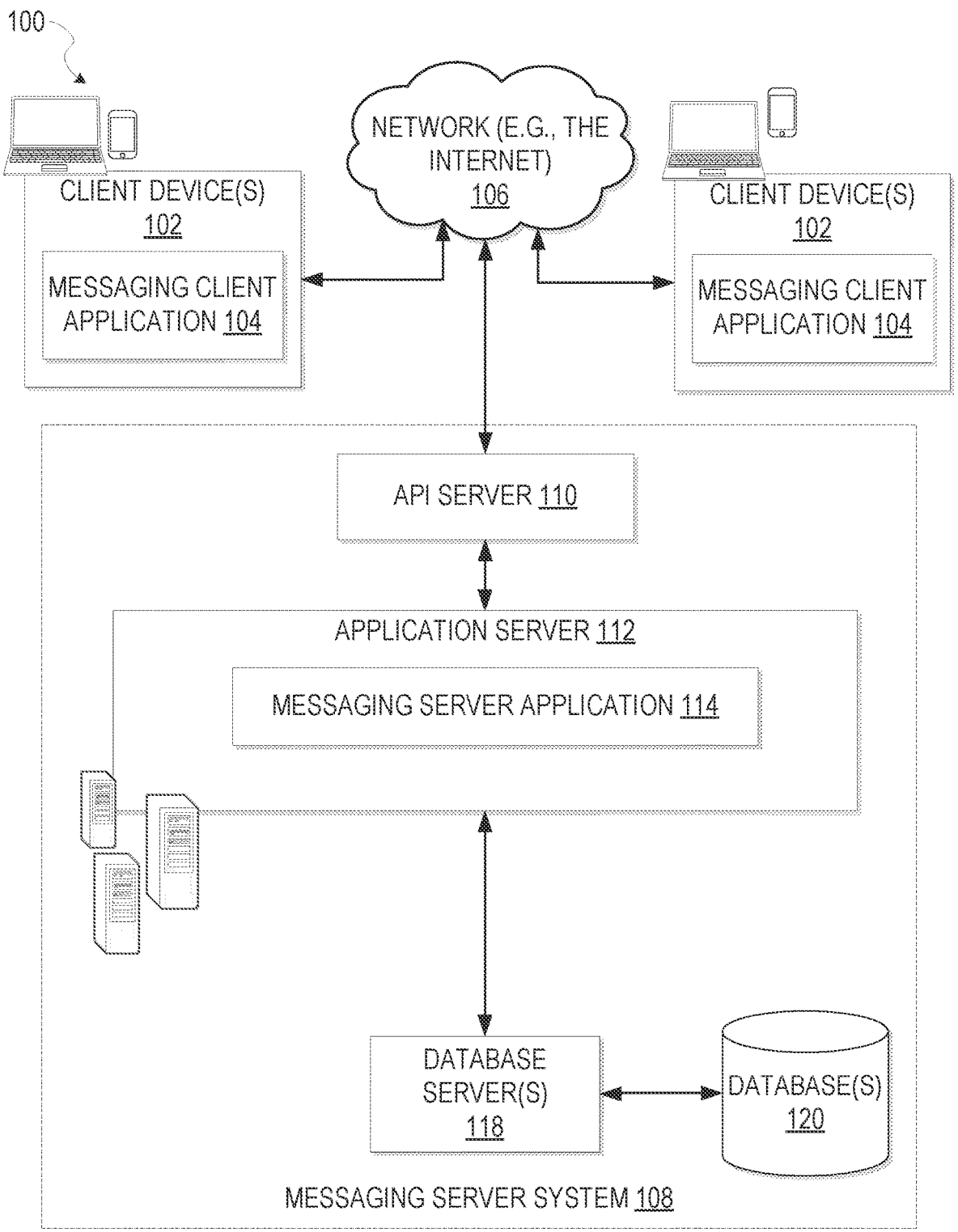
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Aspects of the present disclosure include systems, methods, techniques, instruction sequences, and computing machine program products for managing chat conversation retention models. To address the shortcomings of conventional social media applications described above, a messaging system is configured to include a retention model management system that provides a graphical user interface (GUI) to enable users to specify a message retention model for each electronic chat conversation in which they are included as a participant. The GUI allows users to select from and toggle between multiple retention models to associate with a chat conversation. The messaging system provides notifications to each participant of a chat conversation in response to changes to the retention model associated with a chat conversation.

Each retention model specifies a retention duration that defines an amount of time during which each read message of the chat conversation is accessible to chat participants. More specifically, the retention duration defines the amount of time that each individual message is stored by the messaging system and presented to the participants of the chat conversation after being read by the receiving user. The amount of time may, in some embodiments, be based on when the message was received. Once a particular retention model is associated with a chat conversation, all messages exchanged as part of the chat conversation are retained according to the retention model until a different retention model is associated with the chat conversation.

In an example, a chat conversation between a first and second user may initially be associated with a default retention model that specifies that individual messages of the chat conversation are erased and removed from view immediately after being read by the receiving user (e.g. when a user confirms that a message has been read, when a message has been displayed on a screen for a threshold amount of time, or via any other such system for determining that a message has been read). Accordingly, any new message received while the chat conversation is associated with the default retention model will be erased and removed from view immediately after receiving an indication that the message has been read by the receiving user, unless the receiving user selects to save the message.

Continuing with the example, either the first or second user may use the GUI provided by the retention model management system to switch the retention model from the default retention model to a different retention model that specifies, for example, a 24 hour retention period. Accordingly, any new messages received while the chat conversation is associated with this retention model will be associated with the 24 hour retention period. Thus, read messages will be erased and removed from view 24 hours after receipt. In other embodiments, models may be based on message receipt time without an indication that the message has been read. In further embodiments, any combination of such triggers for message deletion may be used.

By providing the users participating in a chat conversation with the flexibility to change retention models, the retention model management system improves upon the functionality of prior messaging applications by eliminating the need for the chat participants to select each individual message in a chat conversation they wish to save, and instead, allowing chat participants to specify whether messages from certain chat conversations should be saved and for how long. Further, by allowing users to change retention models, users are also enable to switch to a retention model in which all messages are immediately erased upon being read thereby eliminating needless utilization of memory resources as well as increasing the privacy afforded to user communications.

Drawings

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed either by a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114, for possible access by another messaging client application 104; the setting of a collection of media data (e.g., story); the retrieval of such collections; the retrieval of a list of friends of a user of a client device 102; the retrieval of messages and content; the adding of friends to and deletion of friends from a social graph; the location of friends within a social graph; and opening an application event (e.g., relating to the messaging client application 104).

The application server 112 hosts a messaging server application 114 that implements a number of message processing technologies and functions. Other processor- and memory-intensive processing of data may also be performed server-side by the messaging server application 114, in view of the hardware requirements for such processing.

Figure 2:
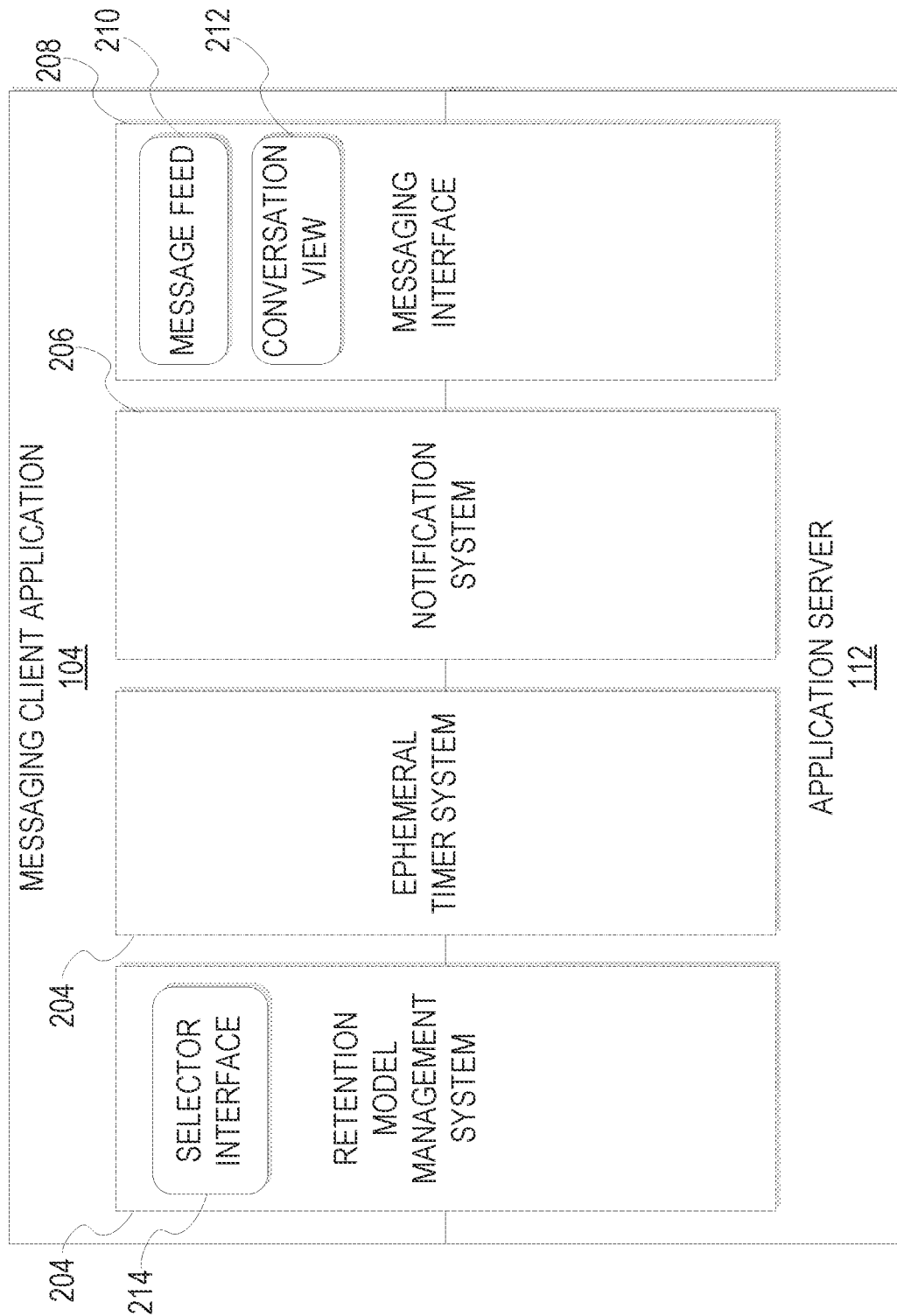
FIG. 2 is a block diagram illustrating further details regarding the messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of subsystems, namely a retention model management system 202, an ephemeral timer system 204, and a notification system 206. The messaging system 100 also includes a messaging interface 208 that includes a message feed 210 and a conversation view 212.

The message feed 210 presents indicators of chat conversations in which a user is a participant. Each chat conversation indicator may be selected to access a conversation view 212 that enables a user to author, send, and view messages of the chat conversation. Each message presented in the conversation view 212 may be presented with a read indicator that indicates whether the message has been read by the receiving user. In some instances, upon a message being read by the receiving user, the read indicator may be replaced with an indicator of remaining time available for accessing the message.

The retention model management system 202 facilitates management of retention models associated with each chat conversation included in the message feed 210. To this end, the retention model management model 202 includes a selector interface 214 that enables user to select one of multiple retention models to associate with a chat conversation, and later change the retention model associated with a chat conversation, if desired. A user may use the selector interface 214 to individually specify the retention model for each chat conversation. As noted above, each retention model specifies a retention duration that defines an amount of time each individual message in a chat conversation is accessible.

Once a user selects a retention model for a particular chat conversation, the retention model management system 202 associates the retention model with the chat conversation. Based on the selected retention model being associated with the chat conversation, the retention model management system 202 configures a retention duration attribute of each newly received message in accordance with the retention duration specified by the selected retention model.

The ephemeral timer system 204 is responsible for enforcing message retention durations for messages exchanged within the context of the messaging system 100. To this end, the ephemeral timer system 204 incorporates a number of timers that, based on retention duration attributes associated with a chat conversation, selectively display and enable access to messages and associated content via the messaging client application 104. Further details regarding the operation of the ephemeral timer system 204 are provided below.

The notification system 206 is responsible for providing notifications related to the exchange of messages within the context of the messaging system 100. The notification system 206 may, for example, provide notifications of newly initiated chat conversations and newly received messages. The notification system 206 may also provide notifications of changes to retention models associated with chat conversations. In an example, the notification system 206 may cause display of a notification within the message feed 210 that the retention model associated with a particular chat conversation presented in the message feed 210 has changed. In another example, the notification system 206 may cause display of a notification within the conversation view 212 that the retention model associated with the chat conversation has changed. In yet another example, the notification system 206 may cause a notification to be pushed from the application server 112 to a client device 102.

Figure 3:
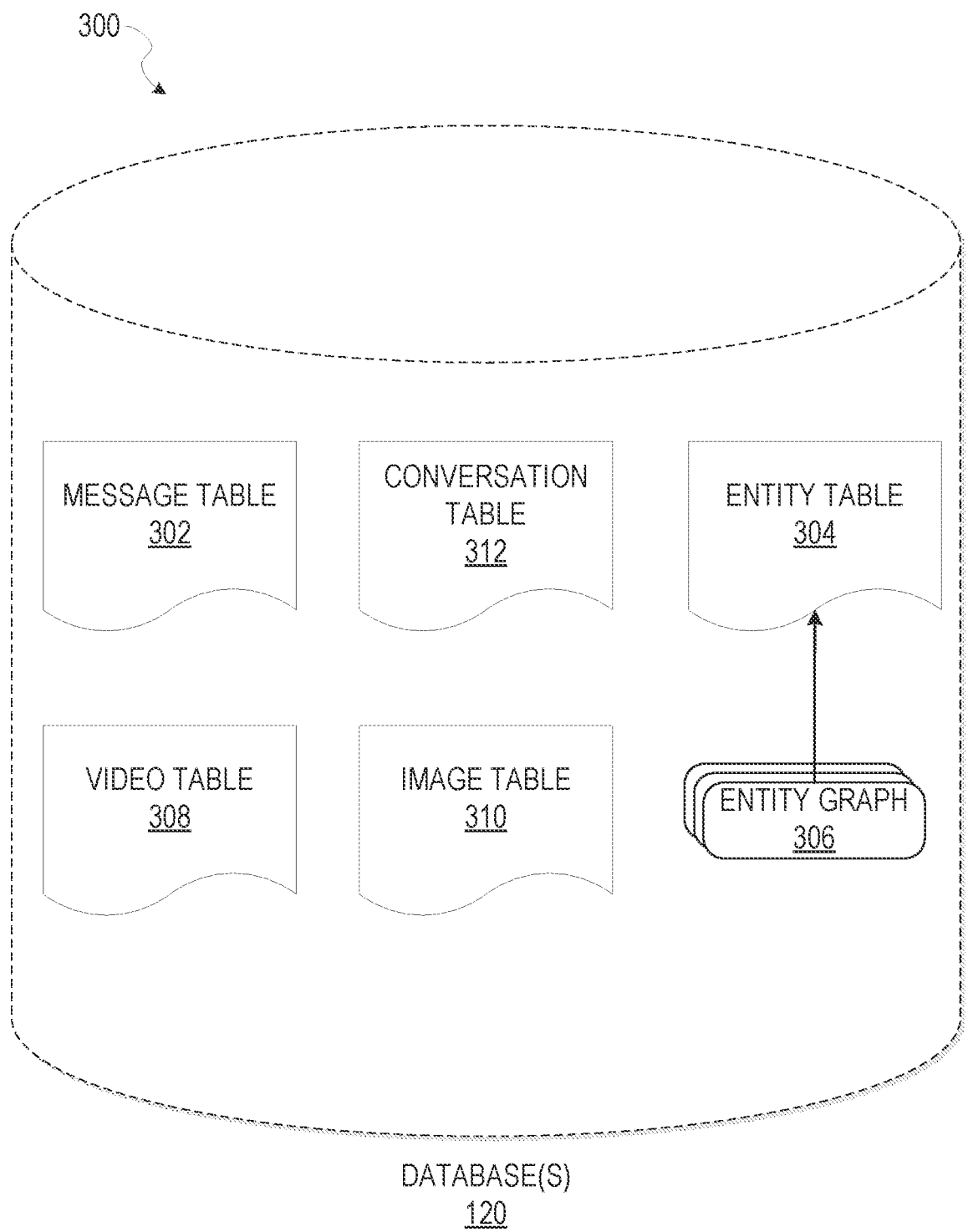
FIG. 3 is a schematic diagram illustrating data which may be stored in a database of a messaging server system, according to example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data 300 could be stored in other types of data structures (e.g., as an object-oriented database).

The database 120 includes message data stored within a message table 302. An entity table 304 stores entity data, including an entity graph 306. Entities for which records are maintained within the entity table 304 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 306 furthermore stores information regarding relationships and associations between entities. Such relationships may be social, professional (e.g., work at a common corporation or organization), interested-based, or activity-based, merely for example.

A video table 308 stores video data associated with messages for which records are maintained within the message table 302. Similarly, the image table 310 stores image data associated with messages for which message data is stored in the message table 302.

A conversation table 312 stores data regarding chat conversation and associated content (e.g., image, video, or audio data). A record for each chat conversation may be maintained in the conversation table 312. Each record may include a unique identifier for the chat conversation, a retention duration attribute based on the retention model associated with the chat conversation, identifiers of entities that are participants in the chat conversation (or pointers to the identifiers in the entity table 304), and message data (or pointers to corresponding message data in the message table 302).

Figure 4:
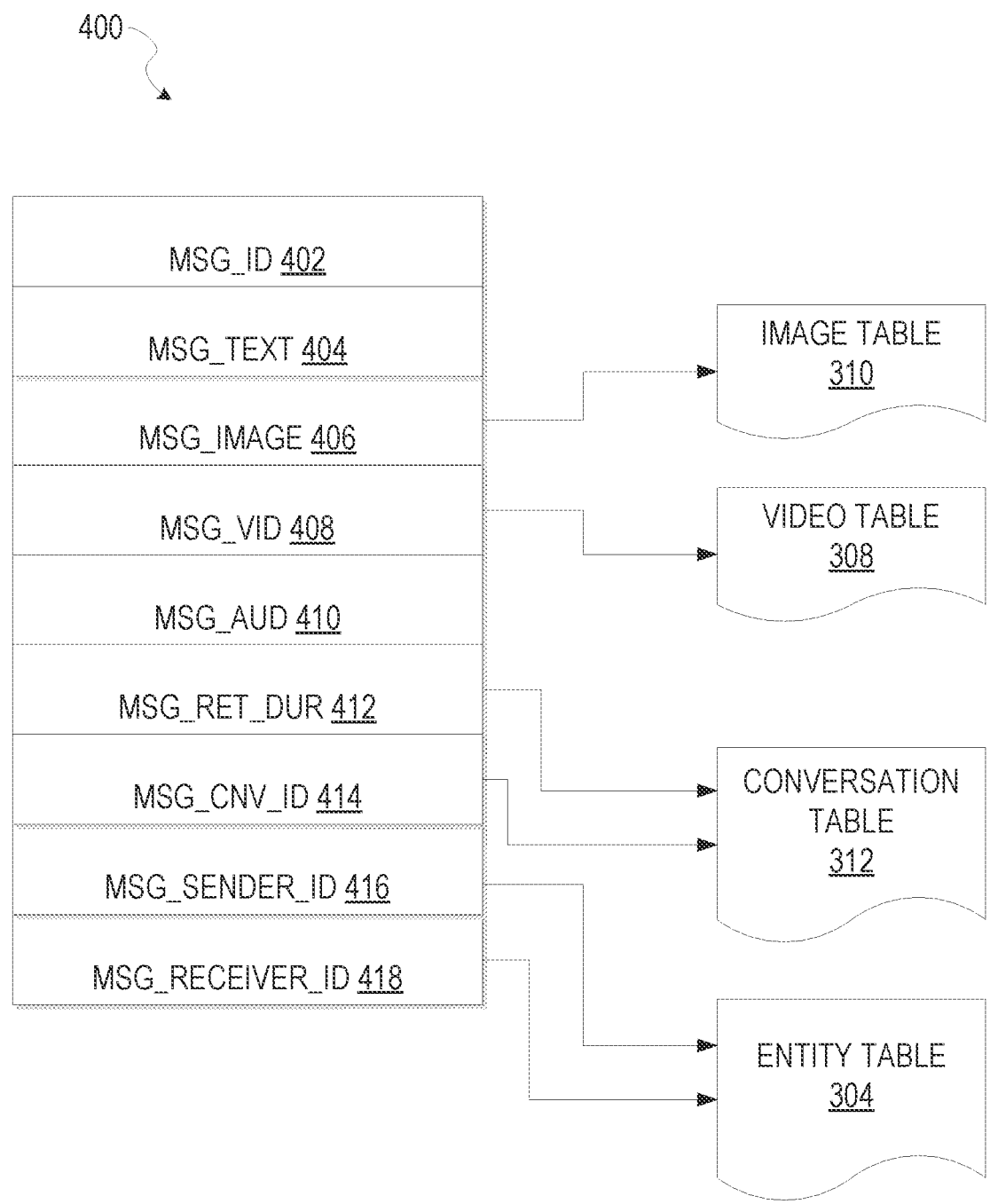
FIG. 4 is a schematic diagram illustrating a structure of a message generated by a messaging client application for communication, according to example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 302 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data, captured by a camera component of the client device 102 or retrieved from memory of the client device 102, and that is included in the message 400.

A message video payload 408: video data, captured by a camera component or retrieved from a memory component of the client device 102 and that is included in the message 400.

A message audio payload 410: audio data, captured by a microphone or retrieved from the memory component of the client device 102, and that is included in the message 400.

A message retention duration attribute 412: an attribute value indicating, in seconds, the amount of time for which content of the message 400 (e.g., the message image payload 406, message video payload 408, and message audio payload 410) is to made accessible to a user via the messaging client application 104 upon accessing the message 400.

A conversation identifier 414: an identifier indicative of the chat conversation to which the message belongs.

A message sender identifier 416: an identifier (e.g., a messaging system identifier, email address, or device identifier) indicative of a user of the client device 102 on which the message 400 was generated and from which the message 400 was sent.

A message receiver identifier 418: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within an image table 308. Similarly, values within the message video payload 408 may point to data stored within a video table 308, values stored within the conversation identifier 414 may point to data stored within the conversation table 312, and values stored within the message sender identifier 416 and the message receiver identifier 418 may point to user records stored within an entity table 304.

Figure 5:
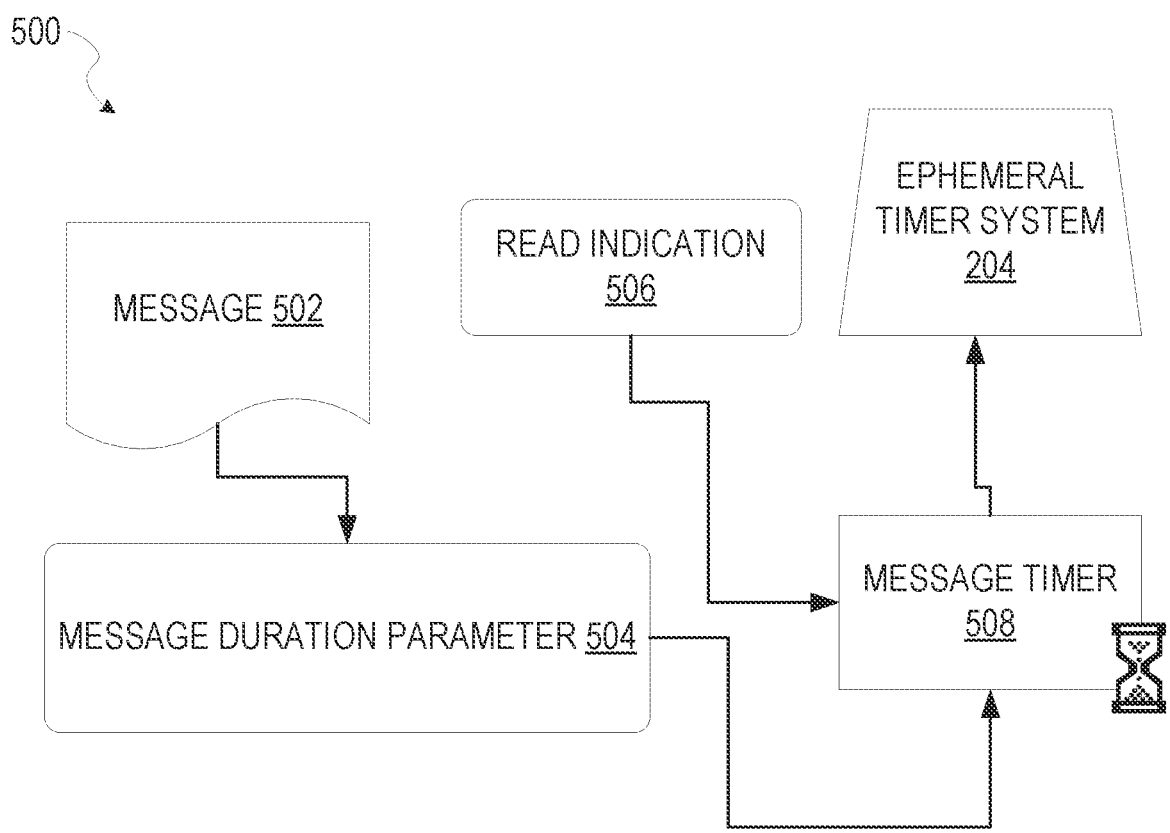
FIG. 5 is a schematic diagram illustrating an example access-limiting process, in terms of which access to content (e.g., an ephemeral message, and associated multimedia payload of data) may be time-limited (e.g., made ephemeral), according to example embodiments.

FIG. 5 is a schematic diagram illustrating an access-limiting process 500, in terms of which access to content (e.g., a message 502, and associated multimedia payload of data) may be time-limited (e.g., made ephemeral).

A message 502 is shown to be associated with a message retention duration attribute 504, the value of which determines an amount of time that the message 502 will be made accessible by the messaging client application 104 upon being read by a receiving user. In one example, the message 502 is accessible for 24 hours upon being read by the receiving user.

The message retention duration parameter 504 (e.g., the value of the message retention duration attribute 412) and a read indication 506 are shown to be inputs to a message timer 508, which is responsible for determining the amount of time that the message 502 is made accessible to the participants of the chat conversation identified by the message sender identifier 416 and the message receiver identifier 418. In particular, the message 502 will only be accessible to the relevant users for a time period determined by the value of the message retention duration parameter 504 after the message 502 has been read by the relevant receiving user. The time period may be based on a message receipt time. The read indication 506 may be triggered by the receiving user accessing the chat conversation in which the message 502 was received, the receiving user confirming that the message 502 has been read, when the message 502 has been displayed on a screen for a threshold amount of time, or via any other such system for determining that the message 502 has been read.

The message timer 508 is shown to provide output to a more generalized ephemeral timer system 204, which is responsible for the overall timing of display of content (e.g., message 502) to a receiving user. When the ephemeral timer system 204 determines that the retention duration specified by message retention duration parameter 504 for a particular message 502 has expired after receiving the read indication 506, the ephemeral timer system 204 causes the message 502 to be erased from memory. Further, the ephemeral timer system 204 causes the messaging client application 104 to no longer display an indicium (e.g., an icon or textual identification) associated with the message 502.

Figure 6:
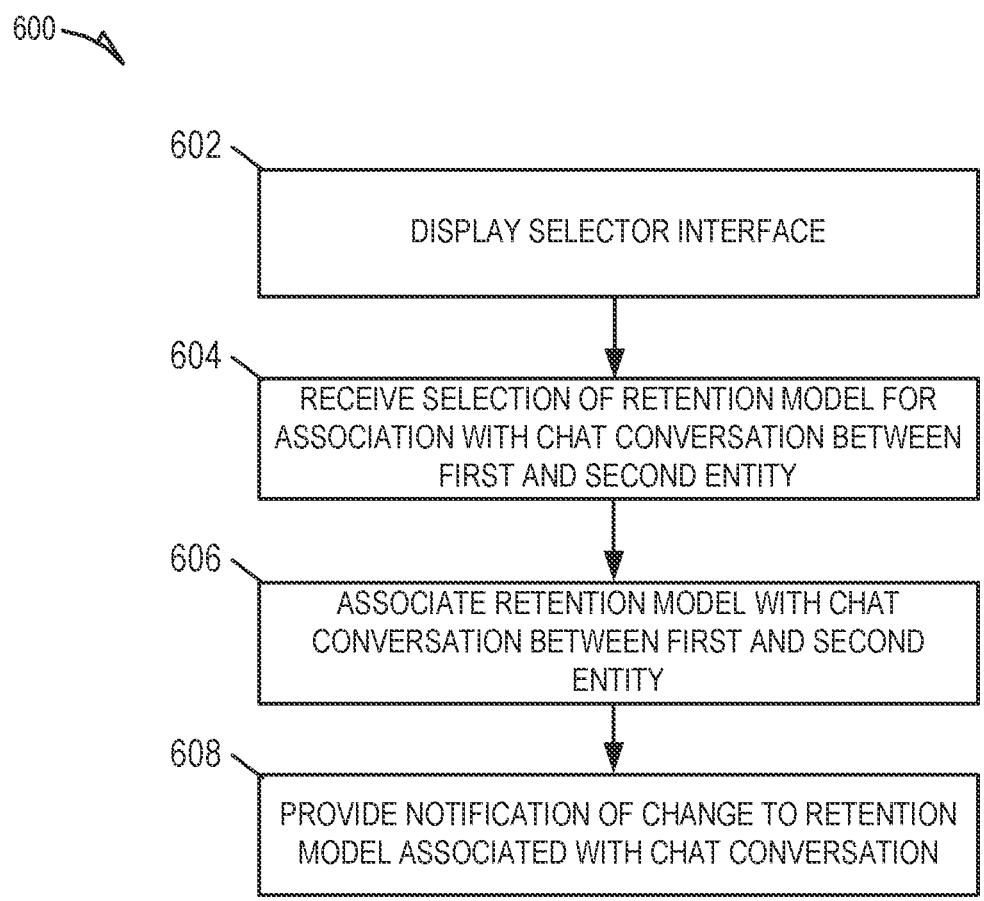
FIGS. 6 and 7 are flowcharts illustrating operations of the messaging system in performing a method for facilitating user management of retention models in electronic chat conversations, according to example embodiments.
Figure 7:
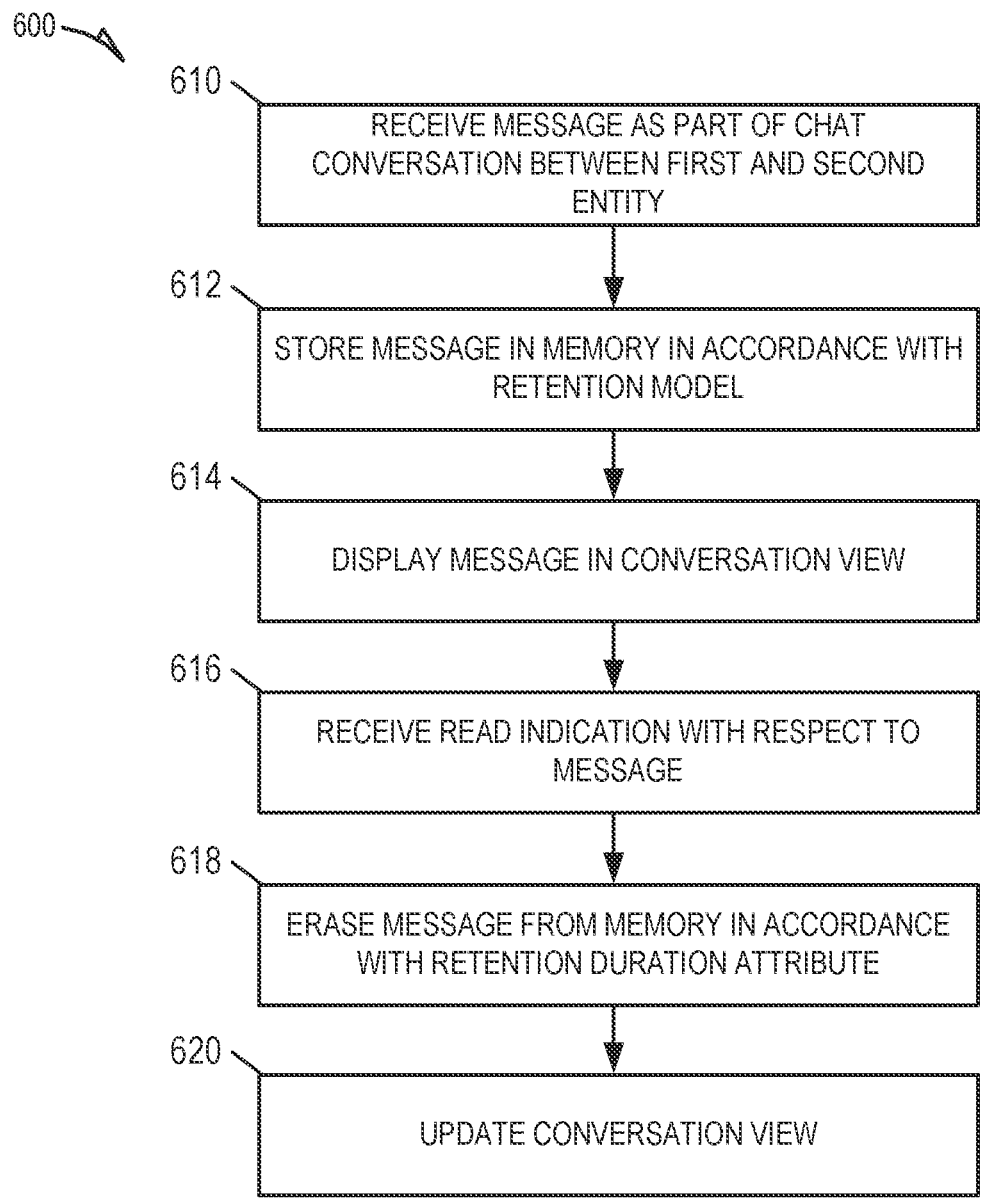

FIGS. 6 and 7 are flowcharts illustrating operations of the messaging system 100 in performing a method 600 for facilitating user management of retention models in electronic chat conversations, according to example embodiments. The method 600 may be embodied in computer-readable instructions for execution by one or more processors such that the operations of the method 600 may be performed in part or in whole by the functional components of the messaging system 100; accordingly, the method 600 is described below by way of example with reference thereto. However, it shall be appreciated that at least some of the operations of the method 600 may be deployed on various other hardware configurations than the messaging system 100.

At operation 602, the messaging system 100 causes display of the selector interface 214 on a client device 102. The selector interface 214 enables user-selection of a retention model for an electronic chat conversation between a first and second user. Accordingly, the selector interface 214 includes multiple predefined retention models from which a user may select a retention model to associate with the electronic chat conversation. In some embodiments, the selector interface 214 may also allow a user to configure parameters of a customized retention model. The selector interface 214 may be presented on the client device 102 of any user involved in the electronic conversation, and any user may use the selector interface 214 to specify the retention model for the chat conversation.

Each retention model specifies a retention duration for each individual message of the chat conversation. The retention duration corresponds to an amount of time that each individual message is accessible to the participating users after being read by the receiving user. More specifically, the retention duration defines the amount of time each individual message is stored by the messaging system 100 and presented within the conversation view 212 displayed on the client devices 102 of the users involved in the chat conversation. As noted above, the retention duration may be based on the time at which the message was received. In embodiments in which the selector interface 214 allows for the configuration of a customized retention model, the selector interface 214 may allow any user involved in the chat conversation to specify the retention duration.

In some embodiments, the chat conversation may be initially associated with a default retention model, and the selector interface 214 allows users involved in the chat to toggle between the default retention model and one or more different retention models. For example, the chat conversation may initially be associated with a default retention model that specifies a zero value retention duration (e.g. messages are made unavailable immediately upon being read by the receiving user, as indicated by a fixed amount of time for the message being displayed, the user navigating away from the message display interface, a user input indicating a message has been read, or any other such system indication of a message being read), and a user involved in the conversation may use the selector interface 214 to select a different retention model that species a non-zero retention duration (e.g., 24 hours from receipt of message).

At operation 604, the retention model management system 202 receives a selection of a particular retention model from the multiple retention models presented within the selector interface 214 on the client device 102 to associate with the chat conversation. The selection may be made and received from the client device 102 of any one of the users involved in the chat conversation. As noted above, the selected retention model specifies a retention duration that defines an amount of time that each individual message in the chat conversation is stored and presented within the conversation view 212.

At operation 606, the retention model management system 202 associates the selected retention model with the chat conversation. For example, the retention model management system 202 may update a value of a retention duration attribute in one or more records in the conversation table 312 in accordance with the retention duration specified by the retention model. Once the selected retention model is associated with the chat conversation, any and every new messages exchanged between the first and second user as part of the chat conversation will be handled in accordance with the selected retention model until such time that the retention model is changed. Any unread messages existing prior to the association of the selected retention model will be handled according to a previous retention model associated with the chat conversation (e.g., a default retention model).

At operation 608, the notification system 206 provides a notification of a change to the retention model associated with the chat conversation to the client devices 102 of the first and second user involved in the chat conversation. In an example, the notification system 206 causes display of an interface element (e.g., a card) that includes the notification within the conversation view 212 in which the messages of the chat conversation are presented. In another example, the notification system 206 causes display of the notification within the message feed 210 that presents indicators of multiple chat conversation in which the corresponding user is involved. In yet another example, the notification system 206 provides the notification by pushing a notification from the application server 112 to the messaging client application 104.

As shown in FIG. 7, the method 600 may further include operations 610, 612, 614, 616, 618, and 620, in some embodiments. The operations 610, 612, 614, 616, 618, and 620 may be performed subsequent to the operation 606, where the retention model management system 202 associates the retention model with the chat conversation.

At operation 610, the messaging system 100 receives a message as part of the chat conversation between the first and second user. The message may be received from the client device 102 of either the first or second user.

At operation 612, the messaging system 100 stores the message in a computer-readable memory in accordance with the retention model associated with the chat conversation. In storing the message, the messaging system 100 configures a retention duration attribute of the message in accordance with the retention duration specified by the retention model. More specifically, the messaging system 100 may set a value of the retention duration attribute of the message in accordance with the retention duration specified by the retention model. In some embodiments, the message is stored in a computer-readable memory of, or coupled to, the application server 112, while in other embodiments, the message is stored locally on one or more client devices 102.

At operation 614, the messaging system 100 causes display of the message in the conversation view 212 presented on the client devices 102 of the first and second user. The display of the message in the conversation view 212 may initially include an indicator of a read status of the message that indicates whether the message has been read by the receiving user. Upon being read by the receiving user, the read indicator may be replaced with an indicator of an amount of time remaining until the messaging system 100 erases the message.

At operation 616, the ephemeral timer system 204 receives a read indication with respect to the message. The read indication may, for example, be triggered by the receiving user (e.g., either the first or second user) selecting and accessing the chat conversation from the message feed given that message is presented to the receiving user upon accessing the chat conversation. As noted above, upon receiving the read indication, the messaging system 100 may update the display of the message to include an indicator of the amount of time remaining until the message is erased and removed from the conversation view.

At operation 618, the messaging system 100 erases the message from the computer-readable memory in accordance with the retention duration attribute associated with the message. In erasing the message from the computer-readable memory in accordance with the retention duration attribute, the ephemeral timer system 204 determines whether the amount of time corresponding to the retention duration has elapsed (e.g., since the message was received), and the messaging system 100 erases the message from the computer-readable memory in response thereto.

In response to determining that the amount of time defined by the retention has elapsed, the messaging system 100 also updates the conversation view 212 displayed on the client devices 102 of the first and second user, at operation 620, by removing the message from the conversation view 212. In other words, the messaging system 100 removes the message from the conversation view 212 of both the sending and receiving user in response to determining that the amount of time defined by the retention has elapsed.

In an example, the retention model specifies a zero value retention duration, and the messaging system 100 erases the message from memory and removes it from the conversation view 212 immediately after receiving the read indication. In another example, the retention model specifies a 24-hour retention duration, and upon receiving the read indication, the messaging system 100 erases the message from the memory and removes it from the conversation view 212 24 hours after receiving the message.

Figure 8:
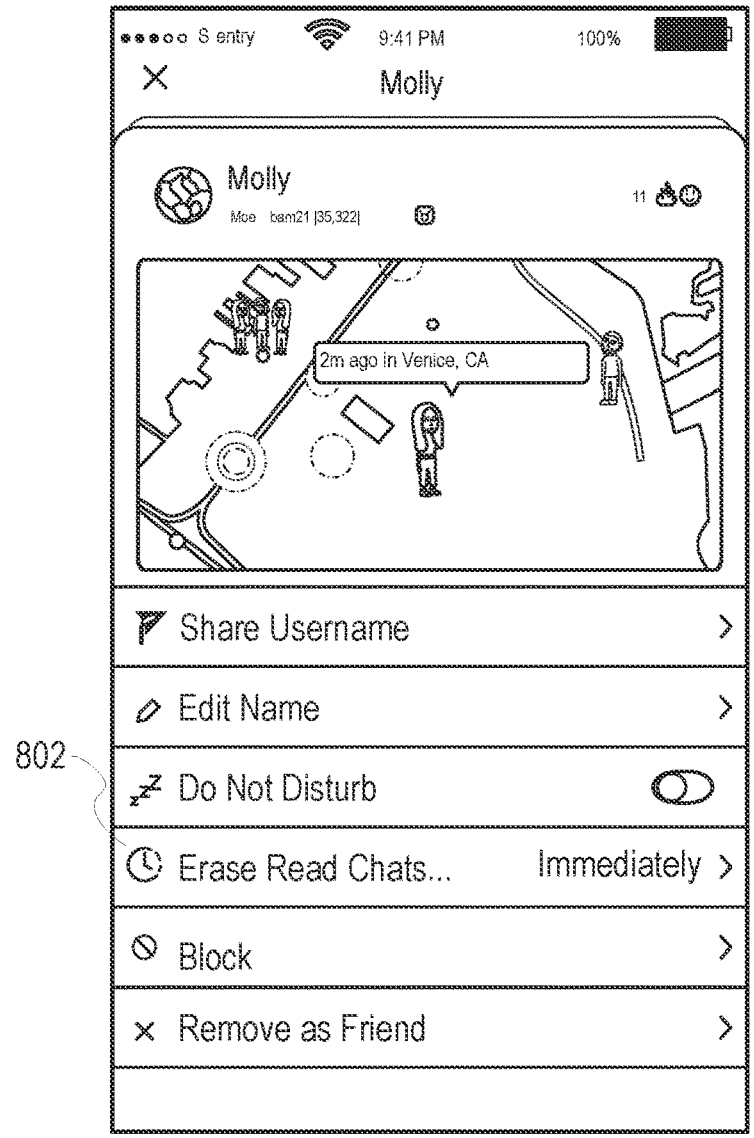
FIGS. 8-11 are interface diagrams illustrating aspects of GUIs provided by the messaging system in facilitating user management of retention models in electronic chat conversations, according to example embodiments.

FIGS. 8-11 are interface diagrams illustrating aspects of GUIs provided by the messaging system 100 in facilitating user management of retention models in electronic chat conversations, according to example embodiments. In the context of FIGS. 8-11, a first user, Joe, is involved in a chat conversation with a second user, Molly. FIG. 8 illustrates an administrative view 800 as displayed on the client device 102 of the first user, Joe. The administrative view 800 enables the first user to manage aspects of a chat conversation with the second user. For example, the administrative view 800 allows the first user to share their username with the second user, edit the name of the chat conversation, suppress notifications related to the chat conversation, block the second user from sending further messages to the first user, and remove a social connection with the second user.

Figure 9:
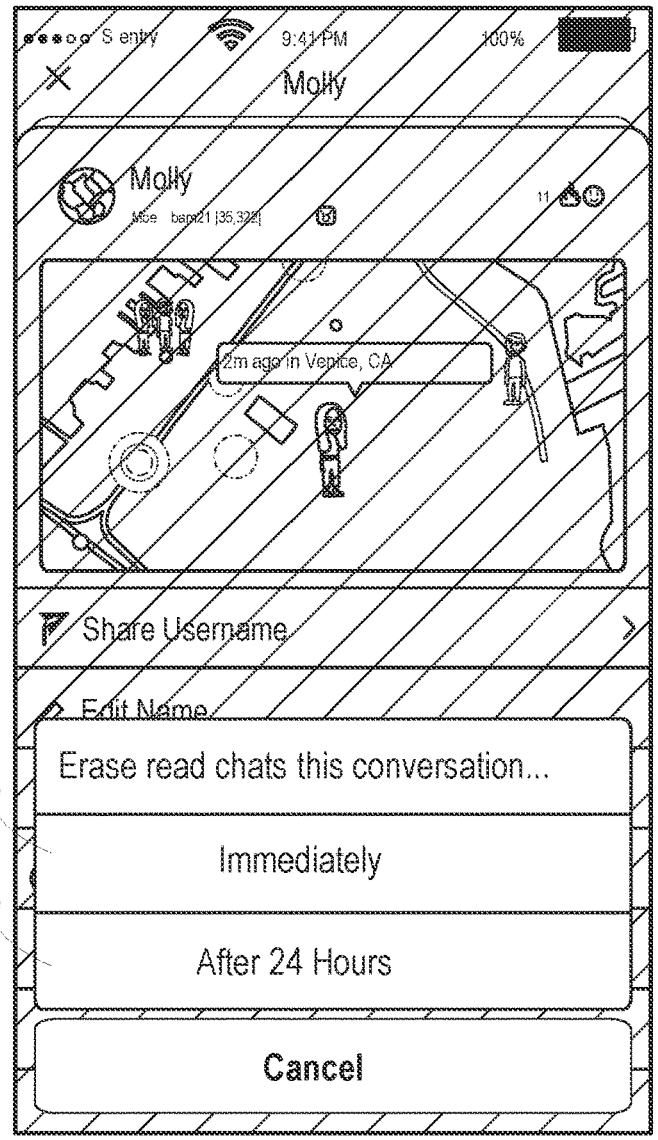

Additionally, through selection of interface element 802, the first user may access a selector interface 900, which is illustrated in FIG. 9. The selector interface 900 illustrated in FIG. 9 is an example of the selector interface 214. As shown, the selector interface 900 presents retention models 902 and 904 for user selection. The retention model 902 specifies read messages will be erased "immediately," and thus the retention model 902 sets forth a zero value retention duration. The retention model 904 specifies read messages will be erased "After 24 hours," and thus the retention model 902 sets forth a 24-hour retention duration. The first user may select either 902 or 904 to associate the corresponding retention model with the chat conversation with the second user.

Figure 10:
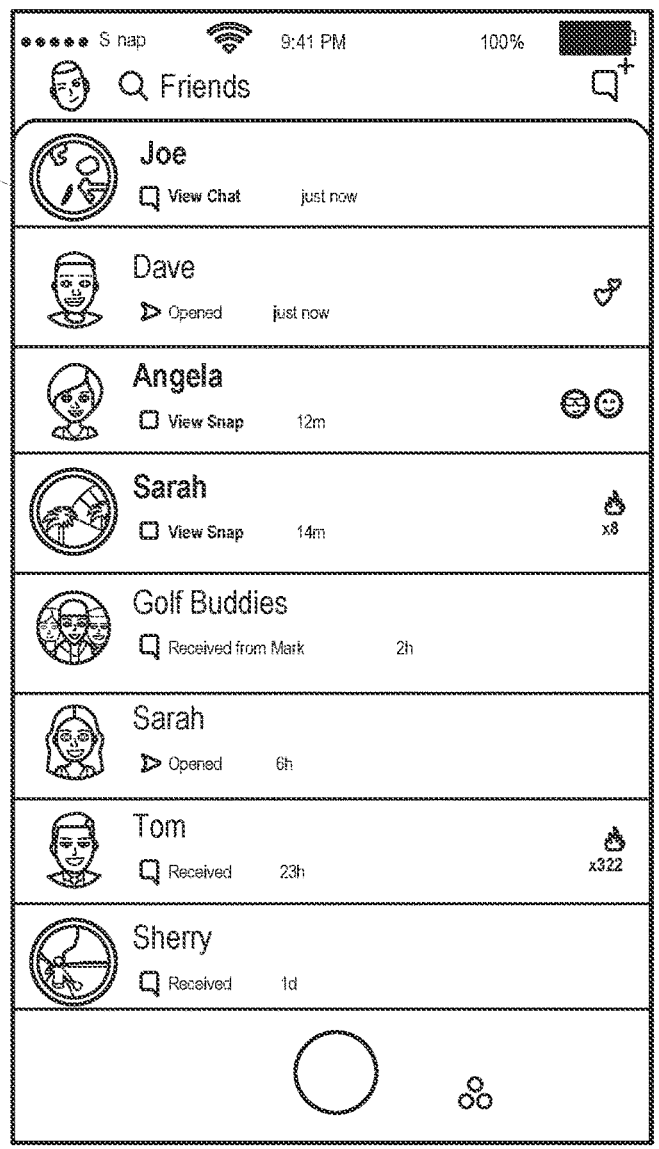

FIG. 10 illustrates a message feed 1000 as displayed on the client device 102 of the second user, Molly. The message feed 1000 is an example of the message feed 210. As shown, the message feed 210 displays indicium of multiple chat conversations in which the second user is a participant. These indicium include an identifier of at least one other user involved in the chat or a customized chat name in addition to a notification of a current status of the chat conversation. The second user may select any one of the indicium to access a conversation view of the corresponding chat conversation.

Figure 11:
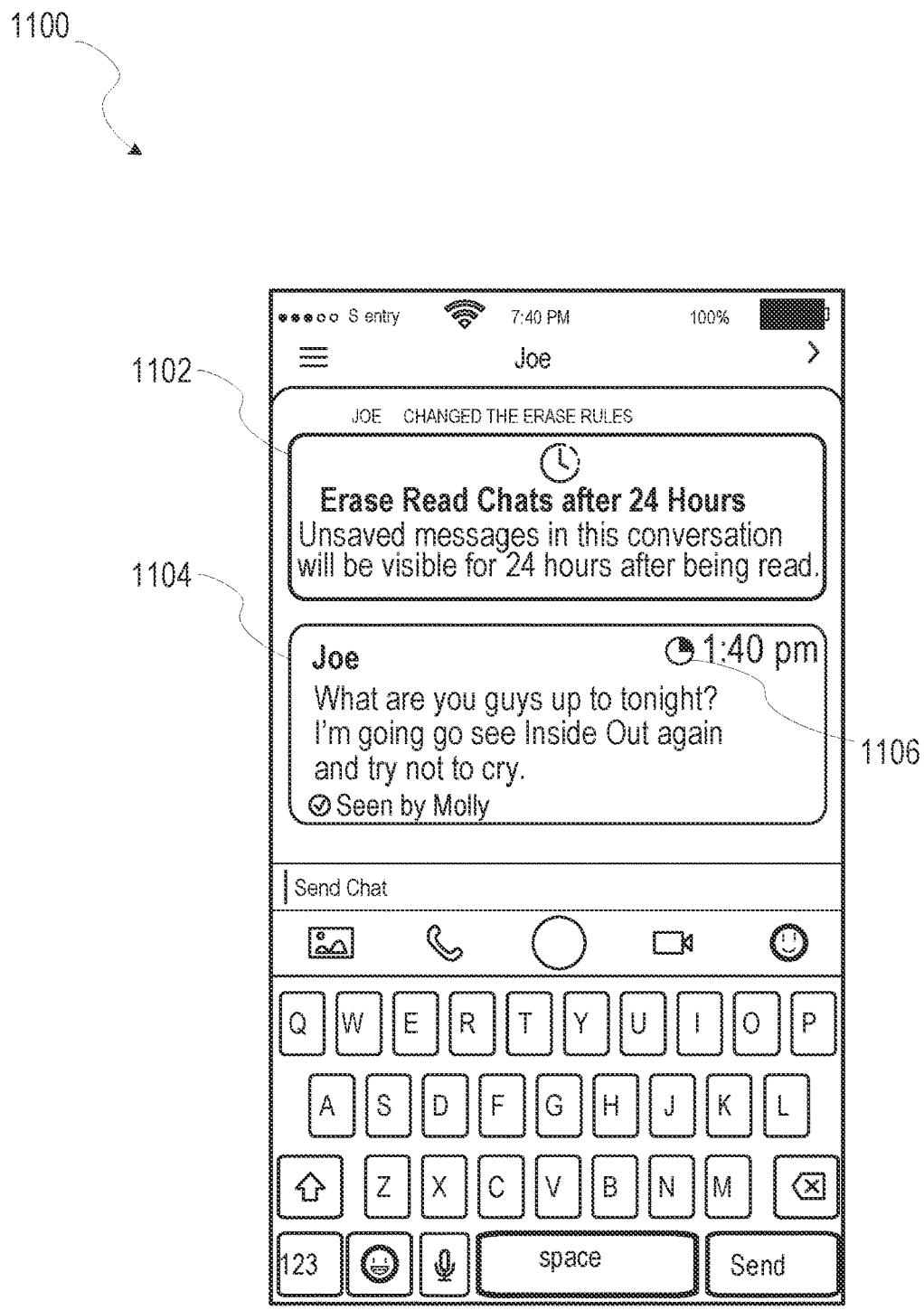

For example, the second user may select conversation 1002 to access a conversation view 1100, which is illustrated in FIG. 11, that displays messages included as part of the chat conversation with the first user, Joe. The conversation view 1100 is an example of the conversation view 212. As shown in FIG. 11, the conversation view 1100 includes a notification 1102 that notifies the second user that the first user has changed the retention model associated with the chat conversation. In particular, the notification 1102 specifies that the first user has changed to the retention model 904 that specifies the 24-hour retention duration.

As shown, the conversation view 1100 also displays a message 1104 received from the first user. The display of the message 1104 includes a retention duration indicator 1106 that indicates, via a timer pie, an amount of time remaining before the message 1104 is erased and removed from the conversation view 1000. Although FIG. 11 illustrates the retention duration indicator 1106 as specifically being a timer pie, the retention duration indicator 1106 is not limited to being a timer pie, and in other embodiments, other indicators of remaining time may be used (e.g., an hour glass).

Software Architecture

Figure 12:
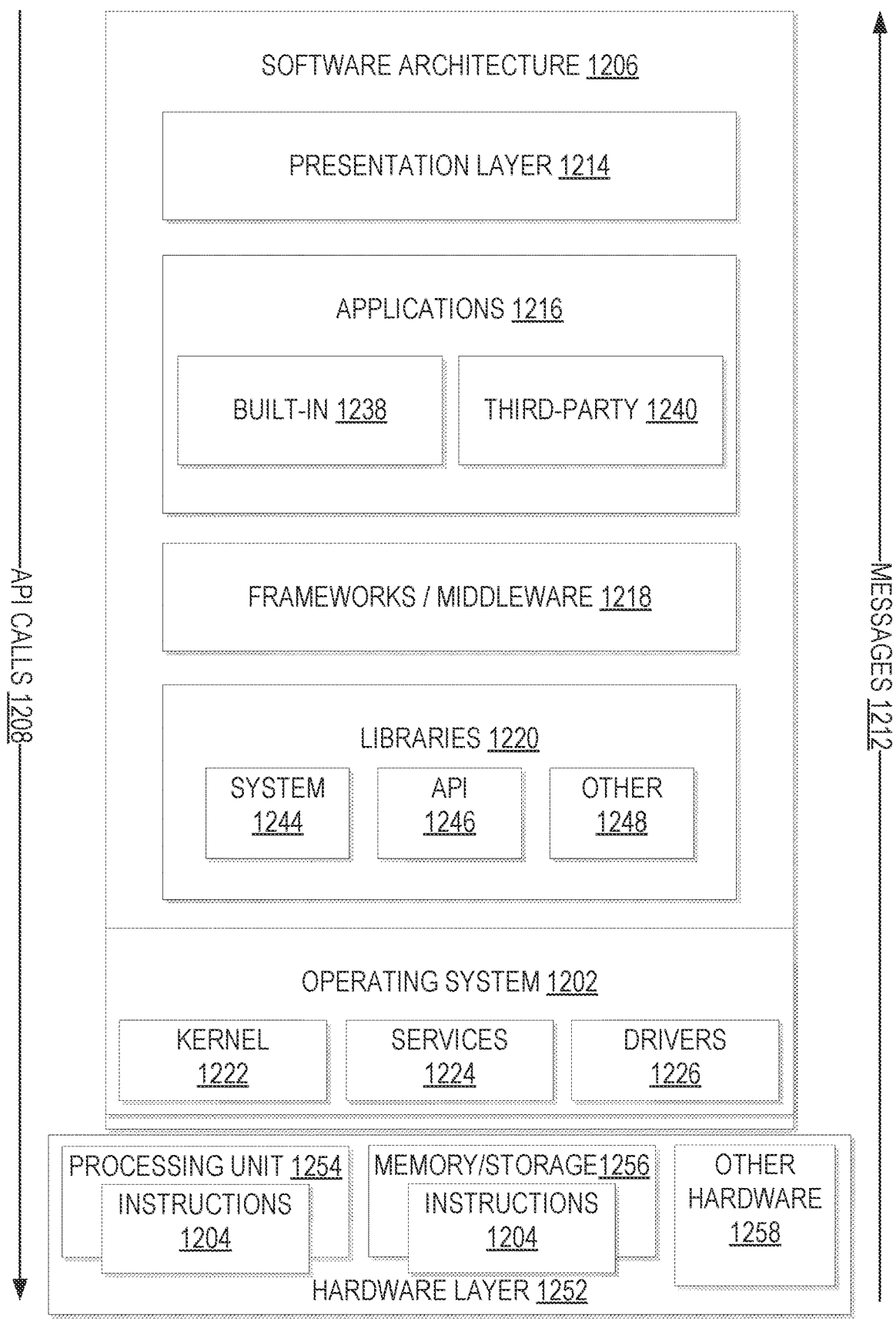
FIG. 12 is a block diagram illustrating a representative software architecture, which may be used in conjunction with various hardware architectures herein described, according to example embodiments.

FIG. 12 is a block diagram illustrating an example software architecture 1206, which may be used in conjunction with various hardware architectures herein described. FIG. 12 is a non-limiting example of a software architecture and it will be appreciated that many other architectures may be implemented to facilitate the functionality described herein. The software architecture 1206 may execute on hardware such as a machine 1300 of FIG. 13 that includes, among other things, processors 1304, memory/storage 1306 and I/O components 1318. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes memory and/or storage modules memory/storage 1256, which also have the executable instructions 1204. The hardware layer 1252 may also comprise other hardware 1258.

In the example architecture of FIG. 12, the software architecture 1206 may be conceptualized as a stack of layers where each layer provides particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke application programming interface (API) calls 1208 through the software stack and receive a response to the API calls 1208 as messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.2124, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users of the system. Alternatively, or additionally, in some systems interactions with a user may occur through a presentation layer, such as the presentation layer 1214. In these systems, the application/component "logic" can be separated from the aspects of the application/component that interact with a user.

Figure 13:
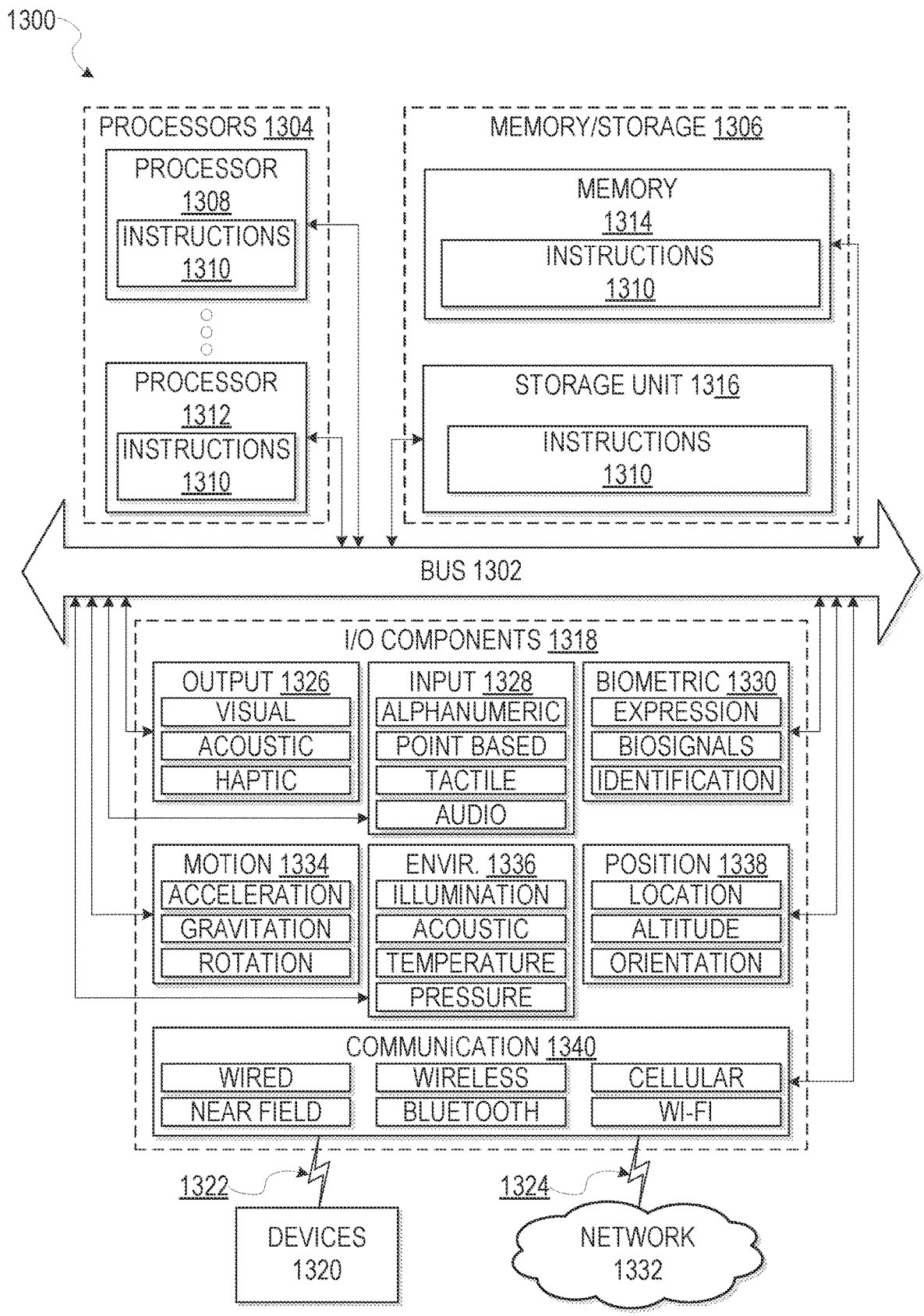
FIG. 13 is a block diagram illustrating components of a machine able to read instructions from a machine-readable medium (e.g., a machine-readable storage medium) and perform any one or more of the methodologies discussed herein, according to example embodiments.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1310 (e.g., software, a program, an application, an applet, an app, or other executable code) for causing the machine 1300 to perform any one or more of the methodologies discussed herein may be executed. As such, the instructions 1310 may be used to implement modules or components described herein. The instructions 1310 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1310, sequentially or otherwise, that specify actions to be taken by the machine 1300. Further, while only a single machine 1300 is illustrated, the term "machine" shall also be taken to include a collection of machines that individually or jointly execute the instructions 1310 to perform any one or more of the methodologies discussed herein.

The machine 1300 may include processors 1304, memory/storage 1306, and I/O components 1318, which may be configured to communicate with each other such as via a bus 1302. In an example embodiment, the processors 1304 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1308 and a processor 1312 that may execute the instructions 1310. Although FIG. 13 shows multiple processors, the machine 1300 may include a single processor with a single core, a single processor with multiple cores (e.g., a multi-core processor), multiple processors with a single core, multiple processors with multiple cores, or any combination thereof.

The memory/storage 1306 may include a memory 1314, such as a main memory, or other memory storage, and a storage unit 1316, both accessible to the processors 1304 such as via the bus 1302. The storage unit 1316 and memory 1314 store the instructions 1310 embodying any one or more of the methodologies or functions described herein. The instructions 1310 may also reside, completely or partially, within the memory 1314, within the storage unit 1316, within at least one of the processors 1304 (e.g., within the processor's cache memory), or any suitable combination thereof, during execution thereof by the machine 1300. Accordingly, the memory 1314, the storage unit 1316, and the memory of the processors 1304 are examples of machine-readable media.

The I/O components 1318 may include a wide variety of components to receive input, provide output, produce output, transmit information, exchange information, capture measurements, and so on. The specific I/O components 1318 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1318 may include many other components that are not shown in FIG. 13. The I/O components 1318 are grouped according to functionality merely for simplifying the following discussion, and the grouping is in no way limiting. In various example embodiments, the I/O components 1318 may include output components 1326 and input components 1328. The output components 1326 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1328 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1318 may include biometric components 1330, motion components 1334, environment components 1336, or position components 1338, among a wide array of other components. For example, the biometric components 1330 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 may include acceleration sensor components (e.g., accelerometer), gravitation sensor components, rotation sensor components (e.g., gyroscope), and so forth. The environment components 1336 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1338 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1318 may include communication components 1340 operable to couple the machine 1300 to a network 1332 or devices 1320 via a coupling 1324 and a coupling 1322, respectively. For example, the communication components 1340 may include a network interface component or other suitable device to interface with the network 1332. In further examples, the communication components 1340 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1320 may be another machine or any of a wide variety of peripheral devices (e.g., a peripheral device coupled via a Universal Serial Bus (USB)).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF4113, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultra book, netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EMPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible medium able to store instructions and data temporarily or permanently, and may include, but is not limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor.

Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), or any combination thereof. A processor may further be a multi-core processor having two or more independent processors (sometimes referred to as "cores") that may execute instructions contemporaneously. "TIMESTAMP" in this context refers to a sequence of characters or encoded information identifying when a certain event occurred, for example giving date and time of day, sometimes accurate to a small fraction of a second.

What is claimed is:

1. A method comprising:
    causing display, on a first client device of a first user, of a selector interface that enables selection of one of a plurality of retention models for association with an electronic chat conversation between the first user and a second user, each retention model specifying a retention duration for messages exchanged between the first and the second user as part of the electronic chat conversation;
    receiving, via the selector interface displayed on the first client device of the first user, a selection, by the first user, of a retention model from the plurality of retention models for association with the electronic chat conversation between the first and second user;
    causing display, on the first client device, of a message feed comprising a set of indicators corresponding to a plurality of chat conversations, an indicator in the set of indicators corresponding to the electronic chat conversation between the first user and the second user, the message feed further comprising a notification of a change from a default retention model to the retention model selected by the first user, the notification being presented in conjunction with the indicator;
    in response to receiving input indicative of a selection of the indicator by the first user, causing display of a conversation view comprising a presentation of the messages exchanged between the first and the second users as part of the electronic chat conversation; and
    causing display, within the conversation view, of the notification of the change from the default retention model to the retention model selected by the first user.

2. The method of claim 1, further comprising causing display, on the second client device, of the notification of the change from the default retention model to the retention model selected by the first user.

3. The method of claim 1, wherein:
    the indicator is a first indicator;
    the electronic chat conversation is a first electronic chat conversation; and
    a second indicator in the set of indicators corresponds to a second electronic chat conversation between the first user and a third user.

4. The method of claim 1, wherein causing display, on the first client device, of the notification includes transmitting, from a server computer, the notification to the first client device.

5. The method of claim 1, further comprising:
    upon receiving a message, causing display, on the first client device of the first user, of the message in the conversation view; and
    based on receiving an indication that the message has been read by the first user, removing the display of the message from the conversation view in accordance with the retention model selected by the first user.

6. The method of claim 1, wherein causing the display of the first message in the conversation view includes causing display of an indicator of an amount time remaining for the receiving user to access the message within the electronic chat conversation.

7. The method of claim 1, wherein:
    the default retention model specifies a zero value retention duration; and
    the retention model selected by the first user specifies retention duration that is non-zero.

8. The method of claim 1, further comprising associating the retention model with the electronic chat conversation such that subsequent messages exchanged as part of the electronic chat conversation are retained for an amount of time specified by the retention model.

9. The method of claim 8, wherein the associating of the retention model with the electronic chat conversation comprises updating a data structure that represents the electronic chat conversation.

10. The method of claim 1, further comprising:
    storing, in a computer-readable memory, a message received, from the second user, as part of the chat conversation between the first and second user, the storing of the message including configuring a retention duration attribute for the message in accordance with an amount of time specified by the retention model selected by the first user; and
    erasing, from the computer-readable memory, the message in accordance with the retention duration attribute associated with the electronic chat conversation.

11. The method of claim 10, wherein the erasing of the message of the electronic chat conversation includes determining the amount of time specified by the retention duration attribute has elapsed since receiving the message.

12. A system comprising:
    one or more processors of a server machine;
    at least one computer-readable memory storing instructions that, when executed by the one or more processors, cause the machine to perform operations comprising:
    causing display, on a first client device of a first user, of a selector interface that enables selection of one of a plurality of retention models for association with an electronic chat conversation between the first and a second user, each retention model specifying a retention duration for messages exchanged between the first and the second user as part of the electronic chat conversation;
    receiving, via the selector interface displayed on the first client device of the first user, a selection, by the first user, of a retention model from the plurality of retention models for association with the electronic chat conversation between the first and second user;
    causing display, on the first client device, of a message feed comprising a set of indicators corresponding to a plurality of chat conversations, an indicator in the set of indicators corresponding to the electronic chat conversation between the first user and the second user, the message feed further comprising a notification of a change from a default retention model to the retention model selected by the first user, the notification being presented in conjunction with the indicator;
    in response to receiving input indicative of a selection of the indicator by the first user, causing display of a conversation view comprising a presentation of the messages exchanged between the first and the second user as part of the electronic chat conversation; and
    causing display, within the conversation view, of the notification of the change from the default retention model to the retention model selected by the first user.

13. The system of claim 12, wherein:
the indicator is a first indicator;
the electronic chat conversation is a first electronic chat conversation; and
a second indicator in the set of indicators corresponds to a second electronic chat conversation between the first user and a third user.

14. The system of claim 12, wherein causing display, on the first client device, of the notification includes transmitting, from a server computer, the notification to the first client device.

15. The system of claim 12, wherein the operations further comprise:
upon receiving a message, causing display, on the first client device of the first user, of the message in the conversation view; and
based on receiving an indication that the message has been read by the first user, removing the display of the message from the conversation view in accordance with the retention model selected by the first user.

16. The system of claim 12, wherein causing the display of the first message in the conversation view includes causing display of an indicator of an amount time remaining for the receiving user to access the message within the electronic chat conversation.

17. The system of claim 12, wherein:
the default retention model specifies a zero value retention duration; and
the retention model selected by the first user specifies retention duration that is non-zero.

18. The system of claim 12, wherein the operations further comprise associating the retention model with the electronic chat conversation such that subsequent messages exchanged as part of the electronic chat conversation are retained for an amount of time specified by the retention model.

19. The system of claim 18, wherein the associating of the retention model with the electronic chat conversation comprises updating a data structure that represents the electronic chat conversation.

20. A non-transitory computer-readable medium storing instructions that, when executed by a computer system, cause the computer system to perform operations comprising:
causing display, on a first client device of a first user, of a selector interface that enables selection of one of a plurality of retention models for association with an electronic chat conversation between the first and a second user, each retention model specifying a retention duration for messages exchanged between the first and the second user as part of the electronic chat conversation;
receiving, via the selector interface displayed on the first client device of the first user, a selection, by the first user, of a retention model from the plurality of retention models for association with the electronic chat conversation between the first and second user;
causing display, on the first client device, of a message feed comprising a set of indicators corresponding to a plurality of chat conversations, an indicator in the set of indicators corresponding to the electronic chat conversation between the first user and the second user, the message feed further comprising a notification of a change from a default retention model to the retention model selected by the first user, the notification being presented in conjunction with the indicator;
in response to receiving input indicative of a selection of the indicator by the first user, causing display of a conversation view comprising a presentation of the messages exchanged between the first and the second user as part of the electronic chat conversation; and
causing display, within the conversation view, of the notification of the change from the default retention model to the retention model selected by the first user.

* * * * *